United States Patent
Williamson

(10) Patent No.: US 8,606,827 B2
(45) Date of Patent: *Dec. 10, 2013

(54) SYSTEMS AND METHODS FOR EXTRACTING DATABASE DIMENSIONS AS DATA MODELING OBJECT

(75) Inventor: Eric Williamson, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 559 days.

This patent is subject to a terminal disclaimer.

(21) Appl. No.: 12/475,441

(22) Filed: May 29, 2009

(65) Prior Publication Data

US 2010/0306281 A1 Dec. 2, 2010

(51) Int. Cl.
*G06F 17/30* (2006.01)

(52) U.S. Cl.
USPC .......................................... 707/804; 707/810

(58) Field of Classification Search
USPC .................. 707/796, 803, 804, 810
See application file for complete search history.

(56) References Cited

U.S. PATENT DOCUMENTS

| | | | |
|---|---|---|---|
| 5,890,167 A | 3/1999 | Bridge, Jr. et al. | |
| 5,978,796 A | 11/1999 | Malloy et al. | |
| 6,035,300 A | 3/2000 | Cason et al. | |
| 6,360,188 B1 | 3/2002 | Freidman et al. | |
| 6,366,922 B1 | 4/2002 | Althoff | |
| 6,434,435 B1 | 8/2002 | Tubel et al. | |
| 6,434,544 B1 | 8/2002 | Bakalash et al. | |
| 6,594,672 B1 | 7/2003 | Lampson et al. | |
| 6,609,123 B1 | 8/2003 | Cazemier et al. | |
| 6,735,590 B1 | 5/2004 | Shoup et al. | |
| 6,931,418 B1 | 8/2005 | Barnes | |
| 7,039,871 B2* | 5/2006 | Cronk | 715/741 |
| 7,093,194 B2* | 8/2006 | Nelson | 715/234 |
| 7,139,766 B2* | 11/2006 | Thomson et al. | 707/999.101 |
| 7,152,062 B1 | 12/2006 | Draper et al. | |
| 7,177,329 B2 | 2/2007 | Kobayashi | |
| 7,240,067 B2 | 7/2007 | Timmons | |
| 7,299,241 B2* | 11/2007 | Reed et al. | 707/999.102 |
| 7,660,822 B1 | 2/2010 | Pfleger | |
| 7,716,257 B2* | 5/2010 | Thomson et al. | 707/809 |
| 2001/0049678 A1 | 12/2001 | Yaginuma | |
| 2002/0029207 A1 | 3/2002 | Bakalash et al. | |

(Continued)

OTHER PUBLICATIONS

Office Action for U.S. Appl. No. 12/475,439 mailed Apr. 29, 2011.

(Continued)

*Primary Examiner* — Jorge A Casanova
(74) *Attorney, Agent, or Firm* — Lowenstein Sandler LLP

(57) ABSTRACT

Embodiments relate to systems and methods for extracting a model object from a multi-dimensional source database. A modeling client can host modeling logic and an application programming interface (API) to create, access, manipulate, and import/export modeling objects used in modeling applications, such as engineering, medical, financial, and other modeling platforms. In aspects, the source data accepted into the modeling client can include consumer or business-level applications, whose database or other content can be extracted and encapsulated in object-oriented format, such as extensible markup language (XML) format. The resulting model object can be pivoted along selected dimensions, or otherwise manipulated. The modeling client can exchange one or more modeling object directly with external platforms, such as mainframe modeling platforms, via the application programming interface (API) on a programmatic basis. Costs and maintenance savings over mainframe-based modeling tools can thereby be achieved, while providing greater power than consumer or business-level tools.

20 Claims, 6 Drawing Sheets

(56) References Cited

U.S. PATENT DOCUMENTS

| | | |
|---|---|---|
| 2002/0035562 A1 | 3/2002 | Roller et al. |
| 2002/0083034 A1 | 6/2002 | Orbanes et al. |
| 2002/0087516 A1 | 7/2002 | Cras et al. |
| 2002/0169658 A1* | 11/2002 | Adler .......................... 705/10 |
| 2003/0114950 A1 | 6/2003 | Ruth et al. |
| 2003/0115194 A1 | 6/2003 | Pitts et al. |
| 2003/0115207 A1 | 6/2003 | Bowman et al. |
| 2003/0120372 A1 | 6/2003 | Ruth et al. |
| 2003/0126114 A1 | 7/2003 | Tedesco |
| 2003/0184585 A1 | 10/2003 | Lin et al. |
| 2003/0225736 A1 | 12/2003 | Bakalash et al. |
| 2004/0039736 A1 | 2/2004 | Kilmer et al. |
| 2004/0133552 A1 | 7/2004 | Greenfield et al. |
| 2004/0139061 A1 | 7/2004 | Colossi et al. |
| 2004/0205617 A1 | 10/2004 | Light |
| 2004/0252136 A1 | 12/2004 | Bhatt et al. |
| 2005/0004904 A1 | 1/2005 | Kearney et al. |
| 2005/0010566 A1 | 1/2005 | Cushing et al. |
| 2005/0015220 A1 | 1/2005 | Ramchandi |
| 2005/0060252 A1 | 3/2005 | Doddington |
| 2005/0060382 A1 | 3/2005 | Spector et al. |
| 2006/0004833 A1 | 1/2006 | Trivedi et al. |
| 2006/0024653 A1* | 2/2006 | Battagin et al. ............... 434/350 |
| 2006/0036707 A1 | 2/2006 | Singh et al. |
| 2006/0136462 A1 | 6/2006 | Campos et al. |
| 2006/0173906 A1 | 8/2006 | Chu et al. |
| 2006/0190844 A1 | 8/2006 | Binder et al. |
| 2006/0262145 A1 | 11/2006 | Zhang et al. |
| 2007/0022093 A1 | 1/2007 | Wyatt et al. |
| 2007/0027904 A1 | 2/2007 | Chow et al. |
| 2007/0088757 A1* | 4/2007 | Mullins et al. ................ 707/200 |
| 2007/0094236 A1 | 4/2007 | Otter et al. |
| 2007/0150820 A1 | 6/2007 | Salvo |
| 2007/0208721 A1 | 9/2007 | Zaman et al. |
| 2007/0211056 A1 | 9/2007 | Chakraborty et al. |
| 2008/0140696 A1 | 6/2008 | Mathuria |
| 2008/0172405 A1 | 7/2008 | Feng et al. |
| 2008/0243778 A1 | 10/2008 | Behnen et al. |
| 2008/0294596 A1 | 11/2008 | Xiong |
| 2008/0320023 A1 | 12/2008 | Fong |
| 2009/0006992 A1 | 1/2009 | Gilboa |
| 2009/0172042 A1* | 7/2009 | Bracha et al. ................ 707/201 |
| 2009/0193039 A1* | 7/2009 | Bradley et al. ............... 707/100 |
| 2009/0222470 A1 | 9/2009 | Kemp et al. |
| 2010/0057700 A1 | 3/2010 | Williamson |
| 2010/0057777 A1 | 3/2010 | Williamson |
| 2010/0131456 A1 | 5/2010 | Williamson |
| 2010/0169299 A1 | 7/2010 | Pollara |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2011/0050728 A1 | 3/2011 | Williamson |
| 2011/0054854 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |

OTHER PUBLICATIONS

Office Action for U.S. Appl. No. 12/475,439 mailed Nov. 10, 2010.
Office Action for U.S. Appl. No. 12/475,458 mailed Jul. 5, 2011.
Office Action for U.S. Appl. No. 12/475,459 mailed Jun. 6, 2011.
Office Action for U.S. Appl. No. 12/475,460 mailed Aug. 15, 2011.
Office Action for U.S. Appl. No. 12/475,452 mailed Aug. 12, 2011.
Office Action for U.S. Appl. No. 12/475,458 mailed Nov. 25, 2011.
Using OLAP and Multi-Dimensional data for decision making, Hasan et al. IEEE 2001.
A new OLAP aggregation based on the AHC technique, Massaoud et al, DOLAP'04 Nov. 12-13, 2004.
Interactive hierarchical dimension ordering, spacing and filtering for exploration of high dimension datasets, Yang et al. IEEE symposium on information visualization 2003.
Williamson, "Systems and Methods for Interpolating Conformal Input Sets Based on a Target Output", U.S. Appl. No. 12/872,779, filed Aug. 31, 2010.
Williamson. "Systems and Methods for Interpolating Alternative Input Sets Based on User-Weighted Variables", U.S. Appl. No. 12/951,881, filed Nov. 22. 2010.
Williamson, "Systems and Methods for Tracking Differential Changes in Conformal Data Input Sets", U.S. Appl. No. 12/951,937, filed Nov. 22, 2010.
Williamson, "Systems and Methods for Training a Self-Learning Network Using Interpolated Input Sets Based on a Target Output", U.S. Appl. No. 12/872,935, filed Aug. 31, 2010.
Williamson, "Systems and Methods for Embedding Interpolated Data Object in Application Data File", U.S. Appl. No. 12/955,717, filed Nov. 29, 2010.
Williamson, "Systems and Methods for Generating Interpolated Input Data Sets Using Reduced Input Source Objects", U.S. Appl. No. 12/955,768, filed Nov. 29, 2010.
Williamson, "Systems and Methods for Filtering Interpolated Input Data Based on User-Supplied or Other Approximation Constraints", U.S. Appl. No. 12/955,790, filed Nov. 29, 2010.
Williamson, "Systems and Methods for Binding Multiple Interpolated Data Objects". U.S. Appl. No. 12/955,811, filed Nov. 29. 2010.
Williamson, "Systems and Methods for Generating Portable Interpolated Data Using Object Based Encodig of Interpolated Results", U.S. Appl. No. 13/037,322, filed Feb. 28, 2011.
Wiliiamson, "Systems and Methods for Generating Interpolation Data Template to Normalize Analytic Runs", U.S. Appl. No. 13/037,332, filed Feb. 28, 2011.
Williamson, "Systems and Methods for Generating Interpolation Data Sets Converging to Optimized Results Using Iterative Overlapping Inputs", U.S. Appl. No. 13/037,341, filed Feb. 28, 2011.
Williamson, "Systems and Methods for Validating Interpolation Results Using Monte Carlo Simulations on Interpolated Data Inputs", U.S. Appl. No. 13/037,344, filed Feb. 28, 2011.
ASPFAQ.com, "What are the valid styles for converting datetime to string?", (2006) http://database.aspfaq.com/database/what-are-the-valid-styles-for-converting-datetime-to-string.html.
Answering Joint Queries from Multiple Aggregate OLAP Databases, Pourabbas et al, LNCS 2737, pp. 24-34, 2003.
USPTO Office Action for U.S. Appl. No. 12/475,459 mailed Feb. 28, 2012.
USPTO Office Action for U.S. Appl. No. 12/475,460 mailed Apr. 19, 2012.
USPTO Office Action for U.S. Appl. No. 12/475,419 mailed Feb. 22, 2012.
USPTO Office Action for U.S. Appl. No. 12/475,458 mailed Mar. 9, 2012.
USPTO Office Action for U.S. Appl. No. 12/475,452 mailed May 16, 2012.
USPTO Office Action for U.S. Appl. No. 12/551,428 mailed Mar. 30, 2012.
USPTO Office Action for U.S. Appl. No. 12/551,393 mailed Dec. 27, 2011.
USPTO Office Action for U.S. Appl. No. 12/551,330 mailed Dec. 7, 2011.

* cited by examiner

SYSTEMS AND METHODS FOR EXTRACTING DATABASE DIMENSIONS AS DATA MODELING OBJECT

FIELD

The present teachings relate to systems and methods for extracting database dimensions as a database modeling object, and more particularly to platforms and techniques for dedicated modeling of technical, medical, financial, and other systems which are configured to extract one or more dimensions out of a database structure and encapsulate that data as a model object capable of being programmatically imported and exported objects to external mainframe platforms, and other resources.

BACKGROUND OF RELATED ART

A spectrum of modeling platforms and options exist today for engineers, managers, developers and other professionals. In the case of engineering, medical, technical, financial, and other advanced modeling resources, a range of platforms are available for users interested in setting up, running and maintaining financial modeling systems. For example, organizations interested in relatively sophisticated modeling applications, such as geophysical models for detecting oil reserves or other geologic features or equity market analysis based on Black-Sholes option pricing models, a company or other organization may choose to install advanced modeling software on mainframe-class computers to run those classes of models and obtain various projections, reports, and other results. Such mainframe-level or other large-scale installations, however, can involve costs on the order of millions of dollars or more, and may require the full time attention of highly skilled professionals, including programmers and managers with advanced training. As a consequence, putting a mainframe-based modeling operation into place may not be practical or possible for many organizations or users.

On the other end of the spectrum, managers, engineers and others may employ widely available entry-level applications to capture operational data and attempt to develop predictive models for engineering, financial, medial, and other applications. That class of applications can include, for example, consumer or business-level spreadsheet, database, or data visualization programs for technical, financial, and other purposes. For instance, a manager of a manufacturing facility may use a commercially available spreadsheet application to enter production numbers, schedules, and other details of that site. However, attempting to extract useful modeling outputs from those classes of applications can be difficult or impossible. For one, spreadsheet, database, and other widely available applications are typically built to produce reports based on already existing data, but not to generate modeling outputs or objects that represent predictive outputs or scenarios. For another, existing spreadsheet, database, and other applications typically involve limitations on cell size, number of dimensions, overall storage capacity, and other program parameters which, in the case of large-scale modeling operations, may be insufficient to operate on the data sets necessary to produce and run meaningful models.

For another, the data structures and outputs of existing spreadsheet, database and other entry-level or commonly available applications are typically arranged in proprietary format, rather than a widely interoperable object-based or other universal format. As still another drawback, the cells, rows, columns, and other data elements within commonly available spreadsheets, databases, and other entry-level programs can not be extracted as separate units and exported to other modeling or analytic tools. In short, the use of spreadsheet, database, and other consumer or business-level applications to conduct modeling operations involves significant shortcomings, due in part to the fact that those classes of platforms are not designed to reliable handle modeling functionality. At present, therefore, a manager, developer, engineer, or other professional or user with modeling requirements is faced with a choice between installing a large and expensive mainframe-based solution with its attendant infrastructure, a spreadsheet or database-based entry level solution with its attendant limitations on power and data handling, or a combination of those two types of platforms. It may be desirable to provide object-based or object-compatible modeling platforms capable of generating modeling objects which encapsulate various modeling features, which are exportable to other external modeling tools, and which can be readily extracted from existing database sources.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for extracting database dimensions as a database modeling object. More particularly, embodiments relate to platforms and techniques that can access, extract, and generate modeling objects in a native object-based or object-compatible format from a multi-dimensional or other database source. The modeling objects produced via a modeling client or other modeling tool according to the present teachings can encapsulate both source data describing a physical, medical, technical, financial, or other process or phenomena, and modeling attributes that relate the source data to predictive scenarios, specific models, and other features. In embodiments, the modeling objects can be extracted or "lifted" from data sources such as database programs or others, and stored to local storage of a local modeling client. The model objects can be made visible or available via the desktop or other user interface of the modeling client. These and other embodiments described herein address the various noted shortcomings in known modeling technology, and provide a user or operator with enhanced modeling power on a desktop or other client, allowing direct extraction and manipulation of database dimensions as independent object-based entities. Systems and methods according to the present teachings also allowing seamless generation, local storage, and communication of model objects to backend mainframe platforms or data centers, middleware servers, other modeling clients, and/or other local or remote modeling, storage, or data processing resources.

Reference will now be made in detail to exemplary embodiments of the present teachings, which are illustrated in the accompanying drawings. Where possible the same reference numbers will be used throughout the drawings to refer to the same or like parts.

Figure 1:
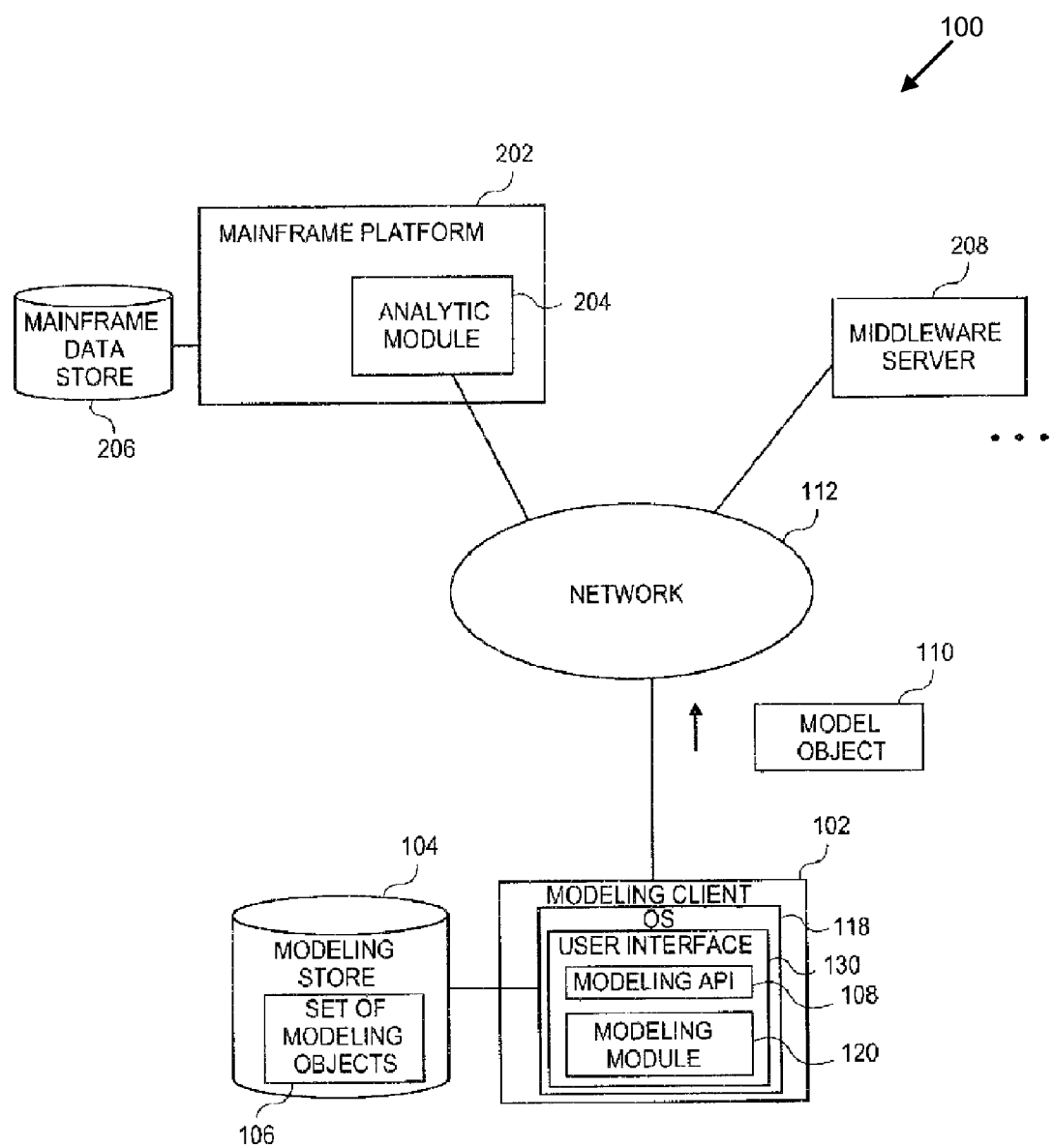
FIG. 1 illustrates an overall system for a modeling network including various hardware and connectivity resources that can be used in systems and methods for extracting database dimensions as a database modeling object, according to various embodiments of the present teachings.

FIG. 1 illustrates an overall network 100 in which systems and methods for extracting database dimensions as a database modeling object can operate, consistent with various embodiments of the present teachings. In embodiments as shown, a modeling client 102 can communicate with a variety of local and remote resources, including an mainframe platform 202 via one or more network 112. Client 102 can be or include, for instance, a personal computer, a server, a dedicated workstation, a mobile device, or other machine, device, hardware, or resource. One or more network 112 can be or include, for example, the Internet, a virtual private network (VPN), a local area network such as an Ethernet™ network, or other public or private network or networks. Mainframe platform 202 can be or include commercially available platforms or installations, such as, merely for example, mainframe or enterprise platforms available from SAP Inc. of Walldorf, Germany, and other sources.

Mainframe platform 202 can include modules, logic, and functionality to perform an array of computation and data storage tasks, including data warehousing, data mining, statistical analyses, financial planning, inventory management, customer resource management, engineering design, and other applications. In implementations as shown, mainframe platform 202 can host or communicate with a variety or resources including, merely illustratively, an mainframe data store 206, and logic or applications including an analytic module 204. Mainframe platform 202 can contain, host, support, or interface to other data processing hardware, software, and other resources. In embodiments, modeling client 102 can likewise communicate with other local or remote resources, such as a middleware server 208 hosting or interfacing to a set of data stores for online analytical processing (OLAP) or other functions. Modeling client 102 can also communicate or interface with other local or remote servers, services, data stores, or other resources.

In embodiments as shown, modeling client 102 can operate under an operating system 118, such as a distribution of the Linux™, Unix™, or other open source or proprietary operating system. Modeling client 102 can present a user interface 130, such as a graphical user interface or command line interface, operating under operating system 118 to receive commands and inputs from a user, and operate modeling client 102. Modeling client 102 can communicate with storage resources including a modeling store 104, such as a local or remote database or data store. Modeling store 104 can store a set of modeling objects 106, in which data, functions, procedures, attributes, and/or other information related to one or more modeling object 110 can be encapsulated and stored. In embodiments, modeling object 110 can be encoded in extensible markup language (XML) format. In embodiments, modeling object 110 can be encoded in other object-based or object-compatible formats or data structures. Modeling client 102 can communicate with mainframe platform 202 via a modeling application programming interface (API) 108. Modeling application programming interface (API) 108 can include, for instance, defined function calls or calls to other routines, calculations, or features, as well as data structures and parameters associated with modeling operations. For example, modeling application programming interface (API) 108 can include a function call to invoke a Monte Carlo simulation model based on a set of supplied data, such as an identified set of dimensions extracted from a spreadsheet or database. Other functions, routines, resources, and features can be called, invoked, or instantiated via modeling application programming interface (API) 108. According to embodiments in various regards, one or more local or remote modeling packages, modules, or other supporting applications can be instantiated via modeling module 120 and modeling application programming interface (API) 108 to manipulate source data and resulting one or more modeling object 110.

In embodiments, a user of modeling client 102 can access, modify, or add data modeling objects to a set of data modeling object 106 via a modeling module 120 hosted in modeling client 102. Set of data modeling objects 106 can include data objects that the user of modeling client 102 has directly entered, or, in aspects, which the user of modeling client has imported or extracted from sources such as consumer or business-level spreadsheet, database, and/or other applications or platforms. Modeling module 120 can itself be or include applications, software modules or hardware modules, or other logic or resources to operate on set of modeling objects 106. Modeling module 120 can, merely illustratively, include or access logic or modules for invoking and manipulating a variety of scientific, technical, engineering, medical, financial, manufacturing, or other modeling operations. For instance, modeling module 120 can be or include applications or logic for performing Monte Carlo simulations, finite element analyses, Black-Scholes option pricing or other market analyses, epidemiological projections, geophysical models or simulations, or other simulations, models, trend mappings, projections, or other predictive processes. In embodiments in one regard, after invoking modeling module 120 and performing any modeling task, the user of modeling client 102 can locally store and/or export one or more modeling object 110 to external platforms or resources.

In embodiments as shown, the user of modeling client 102 can for instance export or communicate one or more modeling object 110 to mainframe platform 202 via modeling application programming interface (API) 108, for storage and use at a local or remote location from within that platform. In aspects, mainframe platform 202 can receive modeling object 110 directly, without a necessity for translation, re-formatting, or invoking any spreadsheet, database, or other application from which data encapsulated in one or mode modeling object 110 originated. In aspects, mainframe platform 202 can operate on one or more modeling object 110, and transmit or return that data or other results to modeling client 102 via modeling application programming interface (API) 108. Thus, according to aspects of the present teachings, modeling objects can be exchanged directly and programmatically between modeling client 102, mainframe platform 202 or other larger-scale or remote platforms, including for instance middleware server 208 or other comparatively large-scale or higher-capacity modeling or analytic tools.

Figure 2:
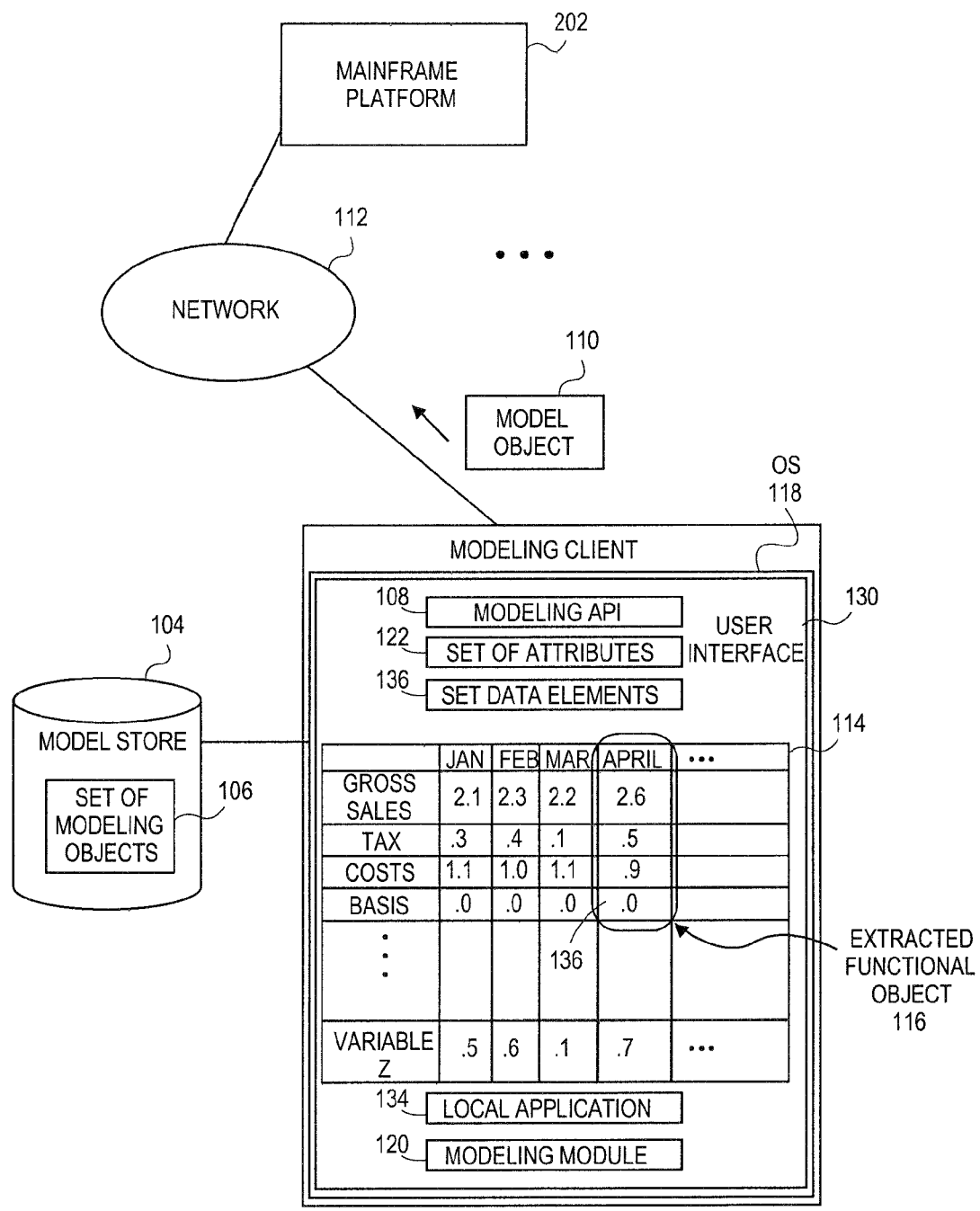
FIG. 2 illustrates an exemplary modeling network including a modeling server and connectivity resources, according to various embodiments.

In terms of operating on source data and generating one or more modeling object 110 for local storage and/or exchange with mainframe platform 202 or other platforms, and as shown for instance in FIG. 2, according to various embodiments, a user of modeling client 102 can invoke modeling module 120 to manipulate a set of source data 114 to identify, configure, and/or extract the functional objects, attributes, or other features of a set of data to produce a modeling output. In embodiments as shown, modeling module 120 can access a set of source data 114, from which data, attributes, and/or other metadata can be extracted to generate one or more modeling object 110. In aspects, set of source data 114 can be generated, hosted, or stored by or in a local application 134, such as a spreadsheet, database, accounting, word processing, presentation, or other application or software. In aspects, set of source data 114 can comprise data previously or newly generated in the form of an object-based modeling object, such as a modeling object entered, imported, or specified by the user of modeling client 102. In aspects, set of source data 114 can comprise data originally stored or generated in a consumer or business-level spreadsheet, database, and/or other application or software. In aspects, set of source data 114 can be initially formatted or encoded in a non-object oriented format, such as in a cellular array or in a relational database format. In aspects, set of source data 114 can be initially formatted or encoded in an object-oriented format, such as extensible markup language (XML) format. In aspects, a user of modeling client 102 can highlight, select, or otherwise specify all or a portion of set of source data 114 to generate one or more extracted functional object 116. For instance, a user can highlight a column of set of source data 114 to identify and extract data as well as functional relationships of interest, to the user, as a unified object. Thus, purely illustratively and as shown, a user may wish to obtain a view on a current month's sales figures including gross sales, tax, production or delivery costs, and cost basis, as well as other parameters related to sales activity. In aspects as shown, a user can, for instance, highlight those functional relationships by dragging a cursor or otherwise selecting a set of cells to group together, and form one or more extracted functional object 116. In aspects, selection can include the extraction of set of data elements 136, such as values stored in spreadsheet cells or database entries. In aspects, once a set of data elements 136 are selected, the functional, computational, or other modeling parameters associated with that data can be stored or associated with one or more extracted functional object 116. For instance, modeling module 120 can store associated routines, computations, processes, or other attributes or functional specifications for one or more extracted functional object 116 in set of attributes 122, which can be stored or associated with one or more extracted functional object 116. In aspects, set of attributes 122 can include the identification of or linkage to any routines, interfaces, or other functional or computational resources that will be associated with one or more extracted functional object. According to various embodiments, analytic module 204 of mainframe platform 202, or other resource or platform receiving one or more extracted functional object 116 from modeling client 102 can thereby obtain both data values derived or obtained from set of source data 114, as well as functional or procedural resources and relationships associated with that data. One or more extracted functional object 116 along with any associated set of attributes 122 can be encoded or stored in one or more modeling object 110, which can thereby be transparently exported to mainframe platform 202, middleware server 208, or other platforms or destinations for further modeling operations.

Figure 3:
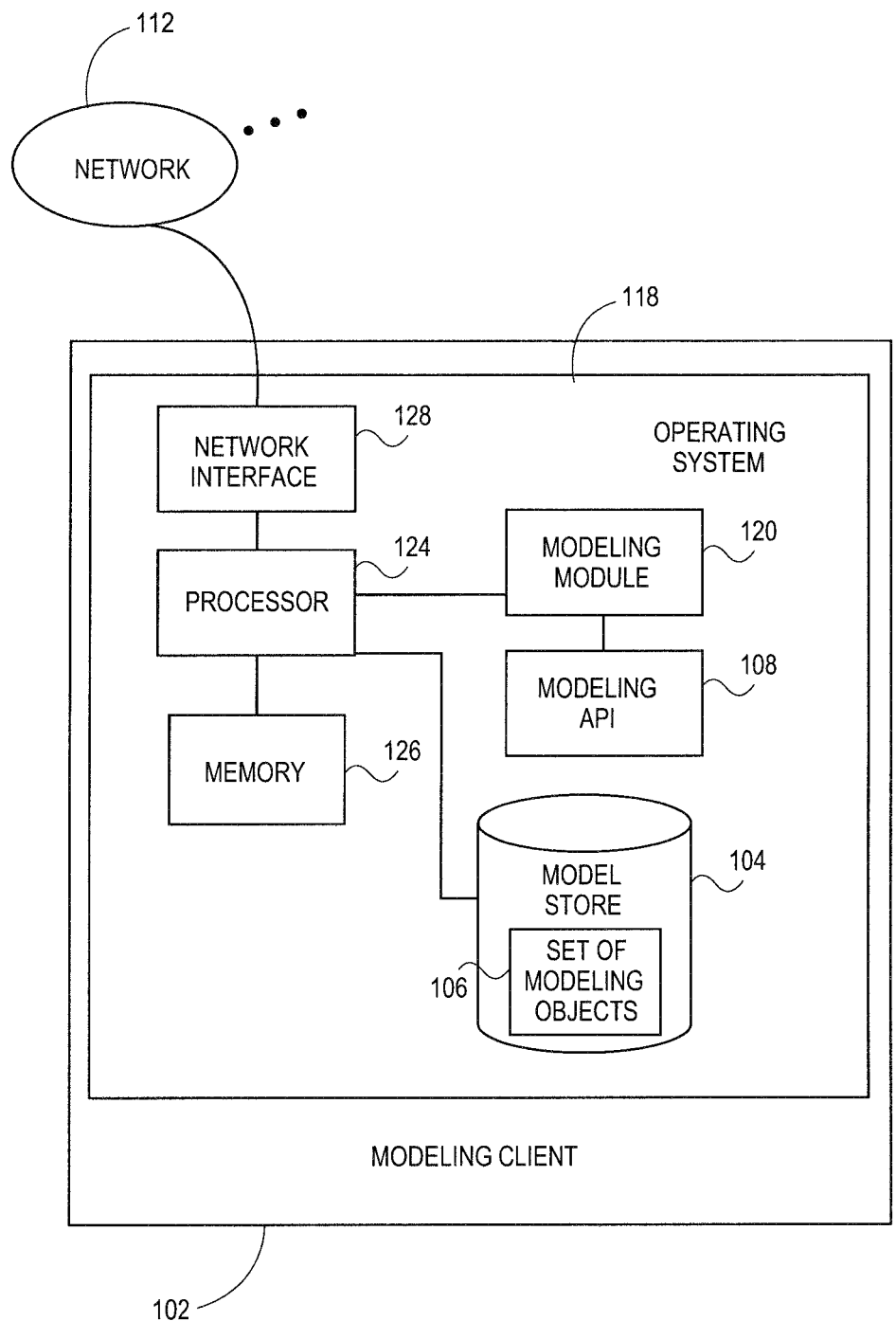
FIG. 3 illustrates an exemplary hardware configuration for a modeling server that can be used in systems and methods for extracting database dimensions as a database modeling object, according to various embodiments.

FIG. 3 illustrates an exemplary diagram of hardware, software, connectivity, and other resources that can be incorporated in a modeling client 102 configured to communicate with one or more network 112, including to interface with mainframe platform 202, middleware server 208, and/or other local or remote resources. In embodiments as shown, modeling client 102 can comprise a processor 124 communicating with memory 126, such as electronic random access memory, operating under control of or in conjunction with operating system 118. Operating system 118 can be, for example, a distribution of the Linux™ operating system, the Unix™ operating system, or other open-source or proprietary operating system or platform. Processor 124 also communicates with a model store 104, such as a database stored on a local hard drive, which may store or host set of modeling objects 106. Processor 124 further communicates with network interface 128, such as an Ethernet or wireless data connection, which in turn communicates with one or more networks 112, such as the Internet, or other public or private networks. Processor 124 also communicates with modeling module 120 along with modeling application programming interface (API) 108 and/or other resources or logic, to execute control and perform modeling calculation, translation, data exchange, and other processes described herein. Other configurations of the network modeling client 102, associated network connections, and other hardware and software resources are possible. While FIG. 3 illustrates modeling client 102 as a standalone system comprises a combination of hardware and software, modeling client 102 can also be implemented as a software application or program capable of being executed by a conventional computer platform. Likewise, modeling client 102 can also be implemented as a software module or program module capable of being incorporated in other software applications and programs. In either case, modeling client 102 can be implemented in any type of conventional proprietary or open-source computer language.

Figure 4:
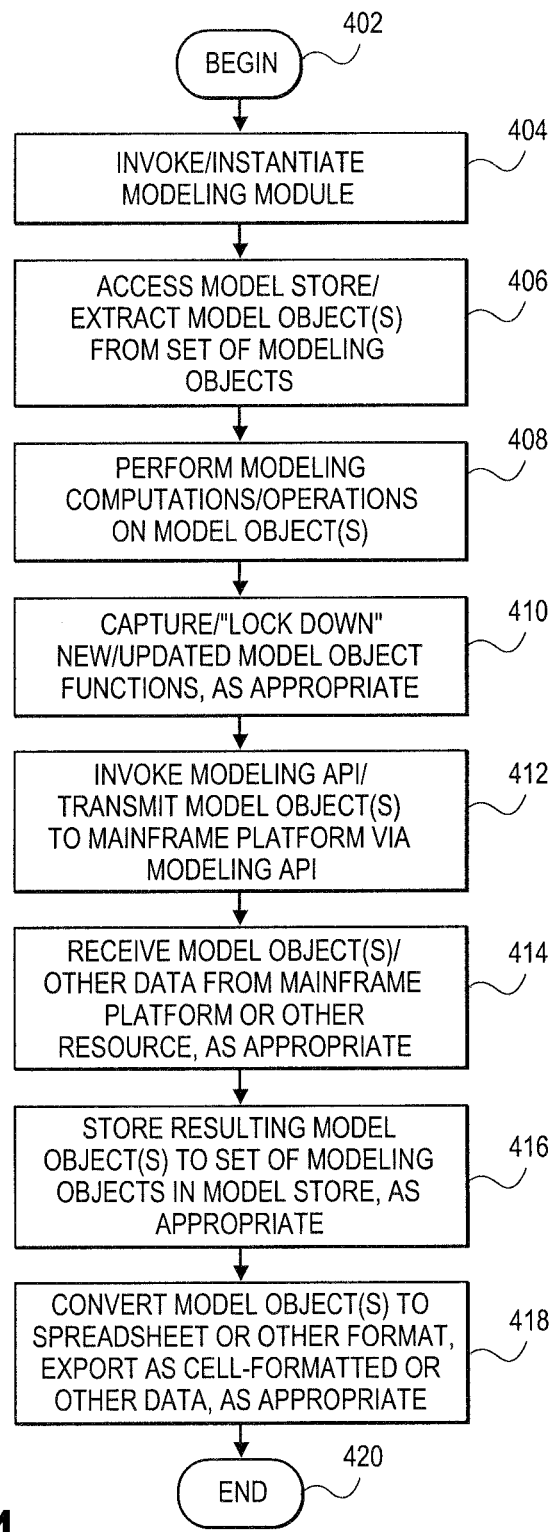
FIG. 4 illustrates a flow diagram of overall modeling processing for object-based modeling associated with extraction of database dimensions and other data as a modeling object, according to various embodiments.

FIG. 4 illustrates a flow diagram of overall processing that can be used in systems and methods for extracting database dimensions as a database modeling object, according to various embodiments. In 402, processing can begin. In 404, a user of modeling client 102 or other client or device can invoke or instantiate modeling module 120 or other logic, to perform modeling operations. In 406, modeling module 120 can access model store 104 and extract one or more modeling object 110 from set of modeling objects 106. In 408, modeling computations or other operations can be performed on one or more modeling object 110. For example, a modeling operation can be performed to project or predict the output of a factory based on various supply scenarios for parts, materials, energy costs, or other variables. In 410, the values, functions, linkages, or other attributes of one or more data modeling object 110 that were accessed, produced, or modified by the modeling operations can be captured, fixed, or locked down by modeling module 120. For instance, the resulting one or more modeling object 110 can be stored to set of modeling objects 106 in model store 104, or other databases or data stores.

In 412, modeling application programming interface (API) 108 can be invoked by modeling module 120, by mainframe platform 202, or other resources to transfer one or mode modeling object 110 to mainframe platform 202. In embodiments, one or more modeling object 110 can for instance be communicated to mainframe platform 202 via a secure connection or channel, such as a secure socket layer (SSL) connection, via a channel encrypted using a public/private key infrastructure, or other channel or connection. In 414, one or more model object 110 can be received in modeling module 120 from mainframe platform 202 or other resource, as appropriate. For example, an updated version of one or more model object 110 reflecting new data, new modeling results, or other information can be received in modeling module 120.

In 416, the resulting new, updated, or modified one or more model object 110 can be stored to set of modeling objects 106 in model store 104, as appropriate. In embodiments, one or more model objects 110 can in addition or instead be stored to mainframe data store 206, to middleware server 208, to another modeling client or other client, or other site or destination. In 418, modeling module 120 can convert one or more model objects 110 to spreadsheet, database, or other format, and export any converted data as a set of cell-formatted information, or data encoded in other formats. For instance, modeling module 120 can convert or translate one or more model objects to cell data values or database entries, and export that data to client-level applications on modeling client 102 or other local or remote devices or storage. In 420, processing can repeat, return to a prior processing point, jump to a further processing point, or end.

Figure 5:
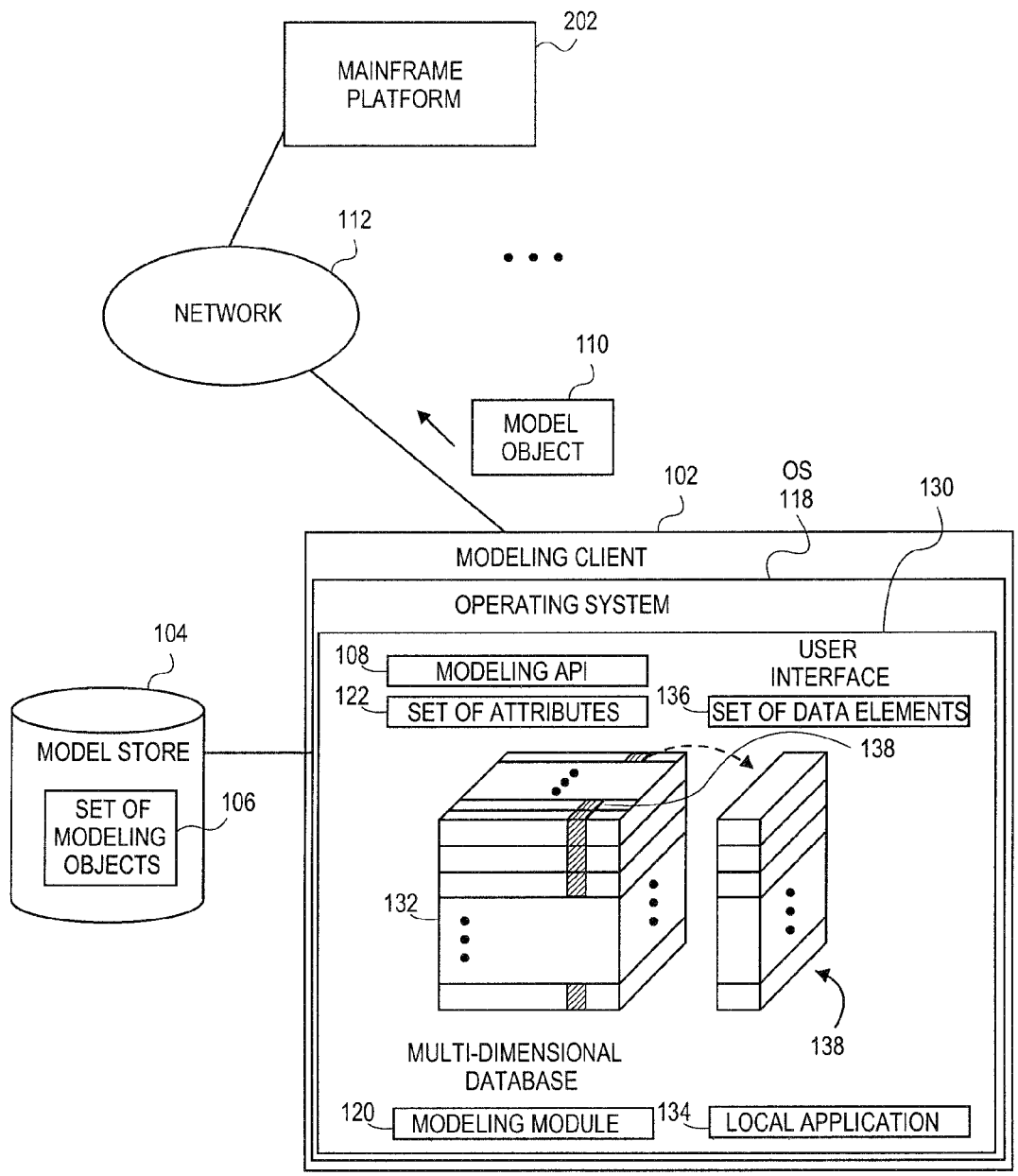
FIG. 5 illustrates exemplary operations to generate modeling objects extracted from a database as a data source, according to various embodiments.

According to various embodiments of the present teachings, and as for example generally illustrated in FIG. 5, in implementations modeling module 120 can generate modeling objects by operating on a multi-dimensional database 132, to serve as source data for modeling operations. In embodiments as shown, a user of modeling client 102 can manipulate a multi-dimensional database 132, such as a relational database or other database application or engine, in conjunction with modeling module 120 to access, view, and operate on the database fields or entries, as source data. In embodiments, the user can identify, highlight, and extract a set of extracted dimensions 138, such as defined set of rows, columns, planes, or other "slices" of multi-dimensional database 132. In aspects, the set of extracted dimensions 138 can comprise a set of contiguous dimensions, or a set of separate or disjoint dimensions of multi-dimensional database 132. Once selected, modeling module 120 can extract a set of constituent data elements 136 associated with the set of extracted dimensions 138. In aspects, modeling module 120 can also extract a set of attributes or other metadata of set of extracted dimensions 138, which can be stored in set of attributes 122, or encoded in other fashion for association with the selected data. In embodiments in various regards, once set of extracted dimensions 138 is extracted, modeling module 120 can capture and store, or lock down, the data content of that object along with any attributes or other metadata, and/or store set of extracted dimensions 138 in modeling object 110. In embodiments, model object 110 so generated can be stored in model store 104, or other local storage of modeling client 102. In embodiments as shown, therefore, model object 110 can reside on modeling client 102, and any one or more selected dimensions of set of extracted dimensions 138 can thereby be extracted or lifted from its original storage or associated application, and become directly available for independent access as a separate object by modeling or other applications. It may be noted that while model object 110 encapsulating set of extracted dimensions 138 of multi-dimensional database 132 can be stored or hosted in modeling client 102, in embodiments, model object 110 can also or instead be transmitted to other local or remote platforms, such as mainframe platform 202, middleware servers, other modeling or other clients, or other destinations.

Figure 6:
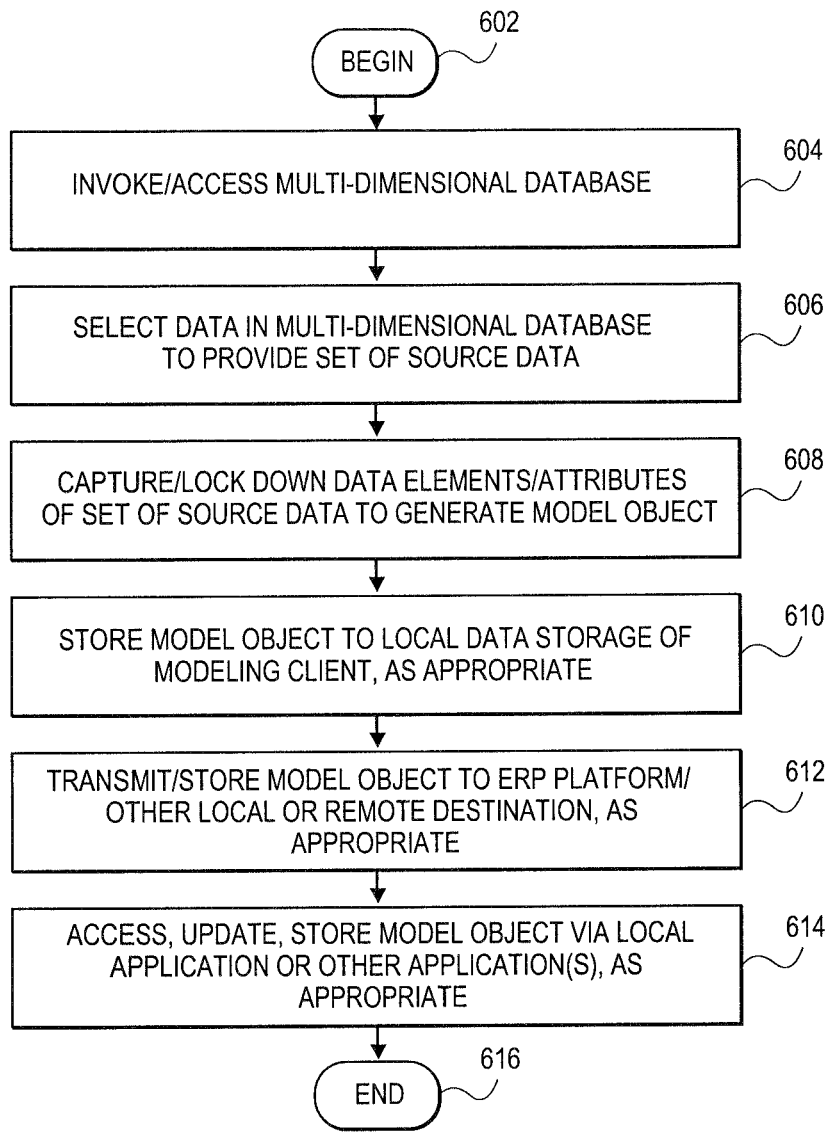
FIG. 6 illustrates a flow diagram of processing to generate modeling objects extracted from a database as a data source, according to various embodiments.

FIG. 6 illustrates a flow diagram of overall processing to generate and manipulate one or more model object 110 extracted from a multi-dimensional database 132, according to various embodiments. In 602, processing can begin. In 604, a user can invoke or initiate one or more multi-dimensional database 132, such as, for instance, a relational database application, or other applications or software capable of accessing or manipulating data in database format. In 606, a user can select data in multi-dimensional database 132 to form or provide a set of extracted dimensions 138, such as by selecting a set of rows, columns, planes, or other dimensions or slices in a database. In 608, modeling module 120 or other logic can capture or lock down the set of data elements 136 as well as the attributes of the set of extracted dimensions 138 to generate model object 110. In 610, modeling module 120 can store model object 110 to local storage of modeling client 102, such as model store 104 or other local storage, as appropriate. In 612, modeling module 120 can transmit model object 110 transmitted to mainframe platform 202 or other local or remote platform or other destination, as appropriate. In 614, model object 110 encoding the set of extracted dimensions 138 can be accessed, updated, and/or stored via local application 134, modeling module 120, and/or other applications or services, as appropriate. In 616, processing can repeat, return to a prior processing point, jump to a further processing point, or end.

The foregoing description is illustrative, and variations in configuration and implementation may occur to persons skilled in the art. For example, while embodiments have been described wherein one or more model object 110 is accessed and manipulated via one modeling client 102, in embodiments, one or more users can use multiple modeling clients, or networks including modeling clients or other resources, to operate on model object data. For further example, while embodiments have been described in which modeling client 102 may interact with one mainframe platform 202 and/or one middleware server 208, in embodiments, one or more modeling client 102 can interact with multiple mainframe, data center, enterprise platforms, middleware servers, and/or other resources, in various combinations. Yet further, while embodiments have been described in which a modeling client 102 interacts with a mainframe platform 202 and/or middleware server 208, in embodiments, rather than interact with large-scale enterprise platforms or middleware servers, modeling client 102 can interact with other local or remote modeling clients, networks of those clients, or, in embodiments, can operate to perform modeling operations on a stand-alone basis, without necessarily communicating with other modeling platforms. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
    invoking a multi-dimensional relational database, the multi-dimensional relational database comprising a set of source data;
    selecting a portion of the multi-dimensional relational database to extract a set of data elements and a set of functional relationships describing relationships between values of the set of data elements of the selected portion;
    encapsulating the set of data elements and the set of functional relationships, of the selected portion, in a predictive database model object, wherein a modeling application performs an operation on the predictive database model object to predict an output;
    sending, by a client computing system, the predictive database model object, comprising the portion of the multi-dimensional relational database, to a mainframe platform, wherein the mainframe platform performs a modeling operation using the set of data elements and the set of functional relationships in the predictive database model object to change at least one of the set of data elements or the set of functional relationships in the predictive database model object; and receiving a modified predictive database model object from the mainframe platform, wherein the modified predictive database model object comprises at least one of a changed set of data elements or a changed set of functional relationships.

2. The method of claim 1, wherein the predictive database model object and the modified predictive database model object are pivotable on a selected dimension of the multi-dimensional relational database.

3. The method of claim 2, wherein the selected dimension comprises one of a row, a column, a plane, or a cell.

4. The method of claim 1, wherein the set of data elements comprises a set of database values.

5. The method of claim 1, wherein the predictive database model object is encoded in extensible markup language (XML) format.

6. The method of claim 1, wherein the set of data elements comprises at least one of a function call parameter or a linkage parameter.

7. The method of claim 1, wherein the predictive database model object is extensible via an appending of an additional extracted set of data elements to the predictive database model object.

8. The method of claim 1, wherein the predictive database model object is exportable via an application programming interface (API).

9. The method of claim 1, further comprising:
converting the modified predictive database model object received from the mainframe platform to a non-object oriented format.

10. A client system, comprising:
an interface to a set of source data, the set of source data hosted in a multi-dimensional relational database; and
a processor coupled to the interface to:
invoke the multi-dimensional relational database,
select a portion of the multi-dimensional relational database to extract a set of data elements and a set of functional relationships describing relationships between values of the set of data elements of the selected portion,
encapsulate the set of data elements and the set of functional relationships, of the selected portion, in a predictive database model object, wherein a modeling application performs an operation on the predictive database model object to predict an output;
send the predictive database model object, comprising the portion of the multi-dimensional relational database, to a mainframe platform, wherein the mainframe platform performs a modeling operation using the set of data elements and the set of functional relationships in the predictive database model object to change at least one of the set of data elements or the set of functional relationships in the predictive database model object; and
receive a modified predictive database model object from the mainframe platform, wherein the modified predictive database model object comprises at least one of a changed set of data elements or a changed set of functional relationships.

11. The system of claim 10, wherein the predictive database model object and the modified predictive database model object are pivotable on a selected dimension of the multi-dimensional relational database.

12. The system of claim 11, wherein the selected dimension comprises one of at least a row, a column, a plane, or a cell.

13. The system of claim 11, wherein the set of data elements comprises at least one of a function call parameter or a linkage parameter.

14. The system of claim 10, wherein the set of data elements comprises a set of database values.

15. The system of claim 10, wherein the predictive database model object is encoded in extensible markup language (XML) format.

16. The system of claim 10, wherein the predictive database model object is extensible via an appending of an additional extracted set of data elements to the predictive database model object.

17. The system of claim 10, wherein the predictive database model object is exportable via an application programming interface (API).

18. The system of claim 10, wherein the processor is further to:
convert the modified predictive database model object received from the mainframe platform to a non-object oriented format.

19. A non-transitory computer readable storage medium including instructions that, when executed by a processor, cause the processor to perform operations comprising:
invoking a multi-dimensional relational database, the multi-dimensional relational database comprising a set of source data;
selecting a portion of the multi-dimensional relational database to extract a set of data elements and a set of functional relationships describing relationships between values of the set of data elements of the selected portion;
encapsulating the set of data elements and the set of functional relationships, of the selected portion, in a predictive database model object, wherein a modeling application performs an operation on the predictive database model object to predict an output;
sending, by the processor, the predictive database model object, comprising the portion of the multi-dimensional relational database, to a mainframe platform, wherein the mainframe platform performs a modeling operation using the set of data elements and the set of functional relationships in the predictive database model object to change at least one of the set of data elements or the set of functional relationships in the predictive database model object; and
receiving a modified predictive database model object from the mainframe platform, wherein the modified predictive database model object comprises at least one of a changed set of data elements or a changed set of functional relationships.

20. The non-transitory computer readable storage medium of claim 19, the operations further comprising:
converting the modified predictive database model object received from the mainframe platform to a non-object oriented format.

* * * * *